3,041,217
PLASTIC LAMINATES

John D. Fennebresque, Los Gatos, Calif., and Irving E. Muskat, Miami, Fla., assignors to Celanese Corporation of America, New York, N.Y., a corporation of Delaware
No Drawing. Filed Oct. 16, 1956, Ser. No. 616,144
9 Claims. (Cl. 154—43)

This application is a continuation-in-part of our copending application Serial No. 382,200 filed September 24, 1953, now abandoned.

This invention relates to plastic laminates and relates more particularly to plastic laminates of thermoplastic fibers particularly cellulose acetate or other organic acid ester of cellulose fibers and a polymerizable resin composition.

An important object of this invention is to provide plastic laminates which will have an improved smoothness even after extended use.

A further object of this invention is to provide plastic laminates having a greatly improved transparency.

Another object of this invention is to provide plastic laminates of high strength.

Other objects of this invention will be apparent from the following detailed description and claims.

A form of plastic laminate that has come into widespread use is prepared by impregnating, i.e. saturating, a fibrous material particularly a glass fiber material such as glass fiber mat or fabric, or generally a sandwich of a glass fiber mat between layers of glass fiber fabric, with a polymerizable unsaturated polyester resin composition and effecting the polymerization of the resin composition, usually with the aid of pressure, and, if desired, heat. The product obtained in this manner is relatively light and strong, is resistant to weathering and may be employed for many purposes. As is well-known in the art, the laminate thus obtained is a substantially non-porous boardy structure, in which the polymerized resin substantially fills all the spaces between the fibers. Typical properties for this type of laminate are given at pages 690 and 691 of the 1952 "Modern Plastics Encyclopedia and Engineers Handbook," published 1952 by Plastics Catalogue Corporation, N.Y. This same publication describes the polyester resins and their uses in laminating at pages 462, 465 and 466, and, in tabular form, at pages 690 to 695. However, the plastic laminate so obtained suffers from a number of drawbacks. The surface of said laminates, although generally smooth, frequently has a number of rough spots or develops such rough spots with use. Presumably, these rough spots develop because the pressure applied during the molding tends to force the polymerizable resin away from the surface layers of the glass fiber material so that the glass fibers project from the surface of the laminated product. These rough spots constitute a weak point in the plastic laminate in that they permit weathering to begin. Removal of the rough spots, by sanding or the like, does not overcome this difficulty since the glass fiber material will be removed more rapidly than the resin, leaving pits or depressions which similarly constitute weak spots for weathering to begin. To eliminate this difficulty it has been the practice to coat the mold with a thick layer of the polymerizable resin so that a coating of said resin will remain on the plastic laminate after the molding is complete. The coating of the mold requires a considerable amount of labor and thereby greatly increases the cost of producing the molded article. Another drawback of these plastic laminates is their relatively low light transmission. Finally, when the plastic laminates are subjected to heavy loads, there is a tendency for delamination or separation of the plastic from the glass fiber to take place.

According to one aspect of the present invention, the development of rough spots in the plastic laminates is substantially prevented by employing as the outermost layer of fibrous material, a batting or mat of thermoplastic fibers such as, for example, cellulose acetate or other organic acid ester of cellulose fibers, polyamide fibers, polyester fibers, polyurethane fibers and polyaminotriazole fibers. The plastic laminates of this construction are not only free from rough spots initially, but retain this freedom from rough spots after extended periods of use. With plastic laminates of extended area and little thickness having two major surfaces, the mats of thermoplastic fibers may be employed to form only one of the outermost layers of the fibrous material in said plastic laminates where freedom from rough spots is important for only one surface of the final product. Where freedom from rough spots is important for both surfaces of the final product, mats of thermoplastic fibers may be employed to form both of the outer layers of the fibrous material. With plastic laminates of other shapes the mats of thermoplastic fibers may be employed as the outer layers of fibrous material on all surfaces where freedom from rough spots is desired, both initially and after extended use.

The mats of thermoplastic fibers eliminate rough spots apparently because the thermoplastic fibers give more readily than glass fibers during the molding so that the molding pressure will not force the resin away from the thermoplastic fibers. As a result, there will be no fibers protruding beyond the surface of the plastic laminate and the weathering resistance of said laminate will be improved. In addition, because of the smoother finish of the laminate no sanding will be required before painting. The plastic laminate will also exhibit an improved resistance to abrasion. Through the use of color and design on the mats of thermoplastic fibers decorative effects may be readily achieved in the plastic laminate. The mats of thermoplastic fibers will also eliminate localized resin concentrations which have been the cause of many rejects in producing the plastic laminates. The mats of thermoplastic fibers show a good formability and may be readily shaped to complex contours without the need of tailoring thereby eliminating a source of expense and improving the appearance of the final products. The use of the mats also eliminates the need for coating the mold with a layer of polymerizable resin thereby effecting a further saving in producing the plastic laminates.

The outer layer or layers of mats of thermoplastic fibers may be combined with other fibrous layers of any desired nature depending on the properties desired in the final product. The outer layer of mats of thermoplastic fibers are particularly advantageous when combined with inner layers of glass-fibered material. Thus, the plastic laminate may comprise a mat or glass fibers positioned between layers of glass fiber fabric, which layers of glass fiber fabric are covered with mats of thermoplastic fibers, the whole impregnated with a polymerizable resin composition and polymerized under pressure. In this way, there will be obtained a product whose physical properties will be determined primarily by the glass fiber materials, but which will be free from the rough spots often associated with the glass fiber materials.

For some applications, best results are obtained when the mats of thermoplastic fibers have been so treated as to produce a coalescence of at least a portion of the fibers whereby a mat of coherent structure is obtained, or the mats have been otherwise treated to impart a coherent structure thereto. Mats of this nature are more easily handled because of their coherent structure so that they may be applied more readily to produce articles of regular shape. In addition, they show less tendency to distort or tear when pressure is applied thereto during the polymerization step. One method of producing a coherent mat of this nature when cellulose acetate fibers are employed to form the mat is to spray the mat with water and to pass the same between heated surfaces such as heated rolls whereby the fibers of cellulose acetate in the outer layers of the mat may be at least partially coalesced. This method of producing a coherent mat is described more fully in Dreyfus, U.S. Patent No. 2,497,117. Other methods of securing a coherent mat may also be employed. For surfaces having less regular shapes, a coherent mat is not as desirable since it does not lend itself as well to forming to said shape without tailoring.

The denier of the thermoplastic fibers in the mat may range between about 1 and 50, while the length of said fibers may range from about 1 to 6 inches or even more. The thermoplastic fibers in said mats will normally be coated with a lubricant or other finish which has been applied thereto during spinning or to assist in the conversion of the fibers into a mat. Depending on the precise nature of these finishes it may be desirable to scour or otherwise treat the mats to remove all or a portion of the finishes from the fibers to improve the adhesion of the polymerized resin thereto. It may also be desirable to apply to the mats or to the thermoplastic fibers of which said mats are made other materials such, as for example, silicones, epoxy resins and polyamides, which will improve the bond of the resin to the fibers. The mats may also be generally impregnated with a resin to stiffen them and improve their strength.

In making up the mats it may be desirable to employ a mixture of thermoplastic fibers of different lengths to improve the resistance of said mats to tearing or thinning during their forming. For example, when a mat is made primarily from thermoplastic fibers having a length somewhere between 1 and 3 inches, there may be mixed with said fibers up to 25% by weight of fibers have a length of 5 to 6 inches, or even more. The longer fibers will act to hold the shorter fibers together thereby producing a stronger mat.

Particularly useful polymerizable liquids for use in accordance with the present invention are the polyfunctional, oxygen-convertible esters of unsaturated dibasic acids such as maleic, fumaric, itaconic or citraconic acids or acetylene dicarboxylic acid and a polyhydric alcohol, particularly dihydric alcohols, including ethylene glycol, propylene glycol, isobutylene glycol, 1,3-trimethylene glycol, hexamethylene glycol, glycerol, methyl glycerol, phthalyl alcohol or polyhydroxy polymers of these alcohols, such as diethylene glycol, triethylene glycol, tetraethylene glycol, dipropylene glycol, polyglycerol, etc. These esters are comparatively high in molecular weight, contain at least two units of the dibasic acid and the polyhydric alcohol and are very adhesive. Such esters may include the unsaturated alkyds such as ethylene glycol with the unsaturated acid to an advanced stage of esterification, for example, to an acid number of 50 or below. They may also include mixed esters in which monohydric alcohols (methyl, ethyl, allyl, methallyl, propyl or tetrahydrofurfuryl alcohol) and/or monobasic acids (acetic, propionic, oleic, stearic acids, etc.) are incorporated in the reaction mixture.

In addition, polyhydric alcohol unsaturated polycarboxylic acid esters formed by reaction of glycol maleate, diethylene glycol fumarate or similar esters having an acid number of 150 or below with a monohydric alcohol such as methyl, benzyl, ethyl or propyl alcohol in amount such that the alcohol introduced exceeds that accountable for by reduction in acid number may also be used.

Often these polyhydric alcohol esters are found to be unduly viscous per se and, accordingly, impregnation of fibrous bases with such esters is very difficult. In many cases it is found advantageous to blend such esters with less viscous polymerizable liquids, including methyl methacrylate, styrene, vinyl acetate, ethyl itaconate, cyclopentadiene, dicyclopentadiene, indene, methyl alpha chloroacrylate, diallyl or dimethallyl esters including allyl carbonate, allyl phthalate, allyl maleate, allyl fumarate, allyl succinate, allyl adipate, or other corresponding polymerizable unsaturated alcohol polyesters or other compounds including divinyl benzene, glycol dimethacrylate, allyl methacrylate, allyl crotonate, etc. The amount of such diluting polymerizable liquid will be dependent upon the actual viscosity of the glycol ester used and the properties required.

The following classes of polymerizable materials may also be used in accordance with the present invention.

(1) Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic methacrylic, alpha or beta chloroacrylic, crotonic or cinnamic acids, including allyl acrylate, allyl alpha chloracrylate, etc.

(2) Polymerizable unsaturated alcohol polyesters of polybasic acids such as phthalic, carbonic, oxalic, succinic, adipic, azalaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate), diallyl phthalate and mixtures thereof.

(3) Polyhydric alcohol esters of unsaturated acids such as acrylic, methacrylic, alpha or beta chloracrylic, crotonic, maleic, fumaric, itaconic, etc. and polyhydric alcohols such as ethylene glycol, diethylene glycol, propylene glycol, dipropylene glycol, triethylene glycol, hexaethylene glycol, glycerol, sorbitol and mannitol, including ethylene glycol diacrylate, etc.

The polymerizable resin composition is mixed with a polymerization catalyst, impregnated into the fibrous material and polymerization is caused to take place. At times, the polymerization is caused to take place under pressure to obtain a product of good physical properties, such as high strength. Depending on the polymerization catalyst system employed, it may or may not be necessary to apply heat to cause the polymerization to proceed, as is well known in the art. The polymerizable resin composition may have incorporated therein suitable dyes, pigments, and other substances capable of altering the appearance of the final product.

The following example is given to illustrate this aspect of the invention further.

*Example I*

A glass fiber mat is sandwiched between two layers of woven glass fiber fabric and there is applied to said structure 0.25 inch thick battings of 2.5 denier cellulose acetate fibers 2 inches in length, which cellulose acetate batting has been treated to coalesce the fibers in the surface layers thereof and thereby render it coherent. The whole is impregnated with a polymerizable resin prepared in the following manner:

20 moles of maleic anhydride, 2 moles of phthalic anhydride, 22 moles of ethylene glycol and 0.1 percent by weight of hydroquinone were placed in a round bottomed flask equipped with a mercury sealed stirrer, gas inlet and a 6 inch column attached to a Liebig condenser. The system was gas tight. The mixture was heated to 188° C. and heating continued for a period of 6 hours during which time the temperature rose to 220° C. and water was distilled off. Carbon dioxide was bubbled through the reaction mixture to establish a substantially inert atmosphere within the flask. The product thus secured had an acid number of about 115.

6.5 moles of normal propanol was added to the flask and the flask was attached to a reflux condenser which condensed the vapors evolved and returned them to the flask. The mixture was refluxed for 6 hours at a temperature gradually rising from 126 to 169° C. During this heating the mixture was agitated and carbon dioxide bubbled through to establish an inert atmosphere.

The product which had an acid number of 90 was heated under reflux for 3 hours with 6 percent by weight of acetic anhydride. The resulting product was topped at a pressure of 2 to 4 mm. of mercury and a temperature of 185–200° C. for 7 hours. The resulting product had an acid number of 35.

70 parts by weight of the liquid obtained was mixed with 30 parts by weight of diallyl phthalate and 3 parts by weight of benzoyl peroxide. This liquid had a viscosity above 500 centipoises.

The impregnated fibrous materials are placed under pressure and held under pressure until the copolymerization is complete. The product obtained is substantially free from rough spots and remains substantially free from such spots even after extended use and weathering.

According to another aspect of this invention, plastic laminates of greatly improved transparency are obtained by employing fibrous materials of cellulose acetate or other organic acid ester of cellulose and impregnating said materials with a polymerizable resin composition in which there is employed an unsaturated polyester resin and vinyl acetate as a monomeric cross-linking agent. Plastic laminates prepared in this manner show a greatly improved transparency as compared with plastic laminates in which the fibrous material is different or in which another monomeric cross-linking agent is employed. This unique coaction between the cellulose acetate and the resin in which vinyl acetate is the monomeric cross-linking agent apparently results from the excellent adhesion of the resin to the fibrous material and to the similarity of the refractive indices of the fibrous material and the resin.

The cellulose acetate fibrous material may be in the form of a mat which may or may not have been rendered coherent by treatment as described above to coalesce at least a portion of the fibers. The cellulose acetate fibrous material may also be in the form of a knitted or woven fabric. Generally, it will be desirable to employ a combination of mat and fabric to obtain the maximum strength at minimum cost. Thus, a coherent mat of cellulose acetate fibers may be sandwiched between two layers of cellulose acetate fabric, the whole impregnated with the polymerizable resin composition and the polymerization caused to take place. The product obtained is more highly translucent. A suitable dye may be incorporated into the resin so as to obtain a colored product of excellent appearance because of its high degree of transparency. In addition, or alternatively, the cellulose acetate fibrous material may have been dyed or have a pigment incorporated therein of the same color as the resin or of a different color. In this way unique decorative effects may be readily obtained.

Although the plastic laminate prepared from cellulose acetate fibrous material as described above shows less tendency to exhibit or develop rough spots than does a plastic laminate prepared from glass fiber fibrous material, it may be desirable in certain cases to cover the cellulose acetate fibrous material with an outer layer comprising a mat of cellulose acetate or other organic acid ester of cellulose fibers as described above. The use of this mat as an outer layer substantially eliminates all tendency for rough spots to occur or develop in the plastic laminates.

The polymerizable resin composition employed for impregnating the cellulose acetate fibrous material comprises an unsaturated polyester resin as described more fully above. This resin is mixed with a comonomer comprising about 25% by weight of vinyl acetate. There may also be present a proportion of another or a plurality of comonomers containing a vinyl group and capable of cross-linking the unsaturated polyester resin. Suitable comonomers which may be used in this way include, for example, styrene, methyl styrene, diallyl phthalate, allyl ethyl maleate, methyl acrylate and methyl methacrylate, all as described above. If desired, however, vinyl acetate may be used as the sole comonomer. There may be employed from about 5 to 95% of the unsaturated polyester resin, the remainder being the comonomer, or preferably from about 25 to 75% of the unsaturated polyester resin in the polymerizable resin composition. The polymerizable resin composition may be mixed with a polymerization catalyst system, impregnated into the cellulose acetate fibrous material and polymerized, all as described above.

Instead of cellulose acetate fibrous material, there may be employed fibrous material of other organic acid esters of cellulose including, for example, fibrous material of cellulose propionate, cellulose butyrate, cellulose acetate propionate and cellulose acetate butyrate.

The following example is given to illustrate this aspect of the invention further.

*Example II*

A cellulose acetate fiber mat is sandwiched between two layers of woven cellulose acetate fabric and there is applied to said structure 0.25 inch thick battings of 2.5 denier cellulose acetate fibers 2 inches in length mixed with 10% by weight of 2.5 denier cellulose acetate fibers 6 inches in length, which cellulose acetate mat has been treated to coalesce the fibers in the surface layers thereof and thereby render it coherent. The whole is impregnated with a polymerizable resin prepared in the following manner:

2120 grams of diethylene glycol and 1960 grams of maleic anhydride were placed in a flask and heated as in Example I at a temperature gradually rising from 172 to 184° C. over a period of 3 hours. This product was a very viscous liquid which had an acid number of 80.

3862 grams of this product and 488 grams of normal propanol were heated under a reflux condenser as in Example I and at reflux temperature for a period of 14 hours. The product was topped at 200° C. and a pressure of 1 mm. of mercury. The resulting product was a fairly fluid liquid having an acid number of 25.

70 parts of the liquid obtained was mixed with 30 parts by weight of vinyl acetate and 3 parts by weight of benzoyl peroxide.

The impregnated fibrous materials are placed under pressure and held under pressure until the polymerization is complete. The product obtained is more uniformly translucent and free from rough spots.

According to still another aspect of this invention, plastic laminates of high strength and low weight are prepared by employing as all or a portion of the fibrous material cellulose acetate or other organic acid ester of cellulose fibers of high tenacity. These high tenacity cellulose acetate fibers may be prepared by stretching cellulose acetate fibers of normal tenacity in the presence of steam, hot water or other swelling agent to increase their length by from about 200 to 2000 percent, or more. Alternatively, the high tenacity cellulose acetate fibers may be prepared by wet-spinning cellulose acetate and stretching the fibers during the wet-spinning operation. The cellulose acetate fibers prepared in this manner, all of which have a tenacity of above about 4 grams per denier, will be referred to herein as "high tenacity" fibers. Plastic laminates prepared with these high tenacity cellulose acetate fibers have an exceptionally high strength and a low weight as compared with plastic laminates prepared with glass fiber materials. A portion, at least, of the high strength of the plastic laminates prepared from high tenacity cellulose acetate fibrous materials results from the exceptionally good adhesion between cellulose acetate fibrous materials and the polymerized resin. As a result of this good adhesion, when the plastic laminates are subjected to heavy loads there will be little or no tendency for delamination or separation of the cellulose acetate fibers from the resin.

The high tenacity cellulose acetate fibrous material may be employed in the form of a mat, which may or may not have been rendered coherent in the manner described above, or in any other manner. It may also be employed in the form of a fabric. Generally, however, to obtain a product of the highest strength and lowest weight with maximum economy it is preferred to use a combination of fabric and mat. Thus, a coherent mat of high tenacity cellulose acetate fibers may be sandwiched between two layers of high tenacity cellulose acetate fabric, the whole impregnated with the polymerizable resin composition and the polymerization caused to take place. If desired, the mat may comprise a mixture, in any desired proportions, of high tenacity and normal tenacity cellulose acetate fibers.

The high tenacity cellulose acetate fibrous material may be employed as the sole fibrous material in the laminate. It may, however, also be combined with other fibrous materials. For example, layers of high tenacity cellulose acetate fabric may be applied to both sides of a glass fiber mat, or layers of glass fiber fabric may be applied to both sides of a mat of high tenacity cellulose acetate fibers. The particular combination of fibrous materials employed will depend on the properties desired in the final product which may be varied considerably by suitable selection of fibrous materials. High tenacity cellulose acetate fiber mats may be employed as the outermost layer of fibrous materials to produce a plastic laminate which will be substantially free from and will not develop any rough spots. These outer mats may be applied to glass fiber materials, to cellulose acetate fiber materials, whether high tenacity or not, or to other fibrous materials. In this use, the high tenacity cellulose acetate fiber mats will not only eliminate rough spots, but will also add to the strength of the final product.

The polymerizable resin composition employed for impregnating the high tenacity cellulose acetate fibrous material comprises an unsaturated polyester resin and, if desired, a polymerizable comonomer, as described more fully above. When the comonomer comprises at least 25% by weight of vinyl acetate and the sole fibrous material employed is cellulose acetate or other organic acid ester of cellulose, the plastic laminate will have an exceptionally high transparency.

Although there is exceptionally good adhesion between cellulose acetate fibrous material and the polymerized resin, the strength of the product is somewhat lowered by the different elongations of these materials under stress. Thus, the polymerized resin has an elongation under stress of the order of 3%, ordinary cellulose acetate fibrous material has an elongation under stress of between 20 and 30% and high tenacity cellulose acetate fibrous material has an elongation under stress of between 5 and 10%. Further to improve the strength of the plastic laminate, it may in some cases be desirable to apply a stress to the cellulose acetate fibrous material to stretch the same and thereby reduce its elongation so that it will equal or approach more closely the elongation of the polyester resin.

Instead of high tenacity cellulose acetate fibrous materials there may be employed high tenacity fibrous materials of other organic acid esters of cellulose, including, for example, cellulose propionate, cellulose butyrate, cellulose acetate propionate and cellulose acetate butyrate.

The following example is given to illustrate this aspect of the invention further.

*Example III*

A high tenacity cellulose acetate fiber mat in which the fibers have a tenacity of 6 grams per denier is sandwiched between two layers of cellulose acetate fiber fabric in which the fibers have a tenacity of 6 grams per denier. The whole is impregnated with the resin set forth in Example II and the resin polymerized in the manner described in Example I. The product obtained is strong and light and is more uniformly translucent.

It is to be understood that the foregoing detailed description is given merely by way of illustration and that many variations may be made therein without departing from the spirit of our invention.

Having described our invention what we desire to secure by Letters Patent is:

1. A plastic laminate comprising an integrated layer of a glass fiber fibrous material, and an outer layer of a mat of thermoplastic fibers on said glass fiber fibrous material, the whole impregnated with the polymerization product of an unsaturated polyester resin.

2. A plastic laminate comprising an integrated layer of a glass fiber mat, layers of glass fiber fabric on said mat, and outer layers of a mat of thermoplastic fibers on said fabric, the whole impregnated with the polymerization product of an unsaturated polyester resin.

3. A plastic laminate comprising an integrated layer of a glass fiber fibrous material, and an outer layer of a mat of unpigmented cellulose acetate fibers on said fibrous material, the whole impregnated with the polymerization product of an unsaturated polyester resin.

4. A plastic laminate comprising an integrated layer of a glass fiber mat, layers of glass fiber fabric on said mat, and outer layers of mats of cellulose acetate fibers of different lengths on said fabric, the whole impregnated with the polymerization product of an unsaturated polyester resin and an unsaturated monomer cross-linking the unsaturated polyester resin.

5. A molded, boardy plastic laminate comprising an integrated layer of a glass fiber fibrous material and an outer layer of a mat of unpigmented organic thermoplastic fibers on said glass fiber material, the whole saturated with the reaction product of a glycol maleate polyester and a liquid ethylenically unsaturated organic monomer reactable therewith, said outer layer substantially preventing the development of rough spots on the surface of said laminate.

6. Process for the formation of plastic laminates comprising forming an assembly comprising a layer of glass fiber material and an outer layer of a mat of organic polymeric thermoplastic fibers on said glass fiber material, the whole impregnated with a polymerizable ethylenically unsaturated polyester resin and an ethylenically unsaturated monomer copolymerizable with said polyester resin, and copolymerizing said monomer and said resin under molding pressure, the presence of said mat of thermoplastic fibers inhibiting the development of rough spots on the surface of said laminate.

7. In the process for the production of plastics laminates by the molding and polymerization under pressure of an assembly comprising glass fiber material saturated with a polymerizable ethylenically unsaturated polyester resin, the improvement which comprises providing said assembly prior to said molding and polymerization with an outer layer of a mat of unpigmented organic thermoplastic fibers whereby to prevent substantially the development of rough spots on the surface of the plastic laminates.

8. In the process for the production of boardy plastic laminates by the molding and copolymerization under pressure of an assembly comprising a glass fiber mat saturated with a mixture of diallyl phthalate and a glycol maleate phthalate polyester, the improvement which comprises providing said assembly prior to said molding and polymerization with an outer layer of a mat of organic thermoplastic fibers whereby to inhibit development of rough spots on the surface of the plastic laminate.

9. In the process for the production of boardy plastic laminates by the molding and copolymerization of an assembly comprising a glass fiber mat saturated with an unsaturated polyester resin and an unsaturated monomer copolymerizable therewith, the improvement which comprises improving the smoothness of the surface of said laminates by applying to the surface of said glass fiber mat, before the impregnation thereof with said resin and monomer, a preformed outer self-supporting layer of thermoplastic fibers unbonded to said glass fiber mat, and thereafter impregnating the resulting unbonded composite with said resin and monomer, prior to the molding and copolymerization of said assembly.

References Cited in the file of this patent

UNITED STATES PATENTS

| | | |
|---|---|---|
| 2,087,441 | Metcalf et al. | July 20, 1937 |
| 2,483,404 | Francis | Oct. 4, 1949 |
| 2,489,985 | Speight | Nov. 29, 1949 |
| 2,495,640 | Muskat | Jan. 24, 1950 |
| 2,534,617 | Mohrman | Dec. 19, 1950 |
| 2,537,126 | Francis | Jan. 9, 1951 |
| 2,543,101 | Francis | Feb. 27, 1951 |
| 2,577,205 | Meyer et al. | Dec. 4, 1951 |
| 2,610,138 | Heritage | Sept. 9, 1952 |
| 2,650,184 | Biefeld | Aug. 25, 1953 |
| 2,703,774 | Morrison | Mar. 8, 1955 |
| 2,772,995 | Wilson | Dec. 4, 1956 |
| 2,830,925 | Fennebresque et al. | Apr. 15, 1958 |
| 2,887,366 | Oberdorfer | May 19, 1959 |